US009424807B2

(12) United States Patent
Lee et al.

(10) Patent No.: US 9,424,807 B2
(45) Date of Patent: Aug. 23, 2016

(54) MULTIMEDIA SYSTEM AND OPERATING METHOD OF THE SAME

(71) Applicant: SAMSUNG ELECTRONICS CO., LTD., Suwon-si, Gyeonggi-do (KR)

(72) Inventors: Dong Han Lee, Seongnam-si (IL); Sung Hoo Choi, Hwaseong-si (KR); Jae Sop Kong, Gwacheon-si (KR); Sung Chul Yoon, Hwaseong-si (KR); Kee Moon Chun, Seongnam-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 167 days.

(21) Appl. No.: 14/201,061

(22) Filed: Mar. 7, 2014

(65) Prior Publication Data

US 2014/0267317 A1 Sep. 18, 2014

(30) Foreign Application Priority Data

Mar. 15, 2013 (KR) ........................ 10-2013-0028336

(51) Int. Cl.
*G06T 1/20* (2006.01)
*G09G 5/36* (2006.01)
*G09G 5/18* (2006.01)

(52) U.S. Cl.
CPC .................. *G09G 5/363* (2013.01); *G09G 5/18* (2013.01); *G09G 2330/021* (2013.01); *G09G 2352/00* (2013.01); *G09G 2360/06* (2013.01)

(58) Field of Classification Search
CPC ......... G06T 15/005; G06T 1/20; G06T 15/04; G09G 5/363; G09G 5/393; G09G 5/006; G09G 5/001; G06F 3/14
See application file for complete search history.

(56) References Cited

U.S. PATENT DOCUMENTS 4,768,192 A 8/1988 Pattavina et al.
5,581,748 A * 12/1996 Anderson .............. G06F 15/17 375/357
6,262,776 B1 7/2001 Griffits
6,784,881 B2 8/2004 Wasserman et al.
6,950,434 B1 * 9/2005 Viswanath .......... H04L 49/3009 370/392
7,043,574 B2 * 5/2006 Saito ....................... H04L 69/14 710/20
7,130,316 B2 10/2006 Kovacevic
7,209,111 B2 4/2007 Kurokawa et al.
7,557,834 B2 7/2009 Kaneko et al.
7,796,198 B2 9/2010 Ikeda et al.
8,023,557 B2 9/2011 Constantinidis et al.
8,223,910 B2 7/2012 Priel et al.
2004/0136288 A1 * 7/2004 Gushima .......... G11B 20/10009 369/47.34
2007/0159490 A1 7/2007 DeGreef
2008/0069153 A1 * 3/2008 Sato ...................... H04J 3/0605 370/509
2010/0138478 A1 * 6/2010 Meng ................ H04N 5/44591 709/203
2010/0146081 A1 * 6/2010 Scherer ............... H04L 65/1013 709/219
2012/0029671 A1 2/2012 Millington et al.
2012/0054511 A1 * 3/2012 Brinks ...................... G06F 1/26 713/310
2012/0106976 A1 * 5/2012 Bernard ................ H04J 3/0647 398/154
2012/0134353 A1 * 5/2012 Streed .............. H04W 56/0085 370/350
2014/0244014 A1 * 8/2014 Weitz ..................... H04H 60/04 700/94

FOREIGN PATENT DOCUMENTS

EP 2398227 12/2011

* cited by examiner

*Primary Examiner* — Todd Buttram
(74) *Attorney, Agent, or Firm* — F. Chau & Associates, LLC

(57) ABSTRACT

A multimedia system includes a main special function register (SFR) configured to store SFR information; a plurality of processing modules each configured to process frames of data, based on the SFR information; and a system control logic configured to control operations of the main SFR and the plurality of processing modules. The plurality of processing modules may process data of different frames at the same time period.

19 Claims, 16 Drawing Sheets

FIG. 9

| | P1 | P2 | P3 | P4 | P5 | P6 | … |
|---|---|---|---|---|---|---|---|
| Module_CFRMID | 1 | 1 | 2 | 2 | – | – | … |
| Module_Enable | 1 | 1 | 1 | 1 | 0 | 0 | … |
| Touch | 0 | 1 | 1 | 1 | 1 | 1 | … |

MULTIMEDIA SYSTEM AND OPERATING METHOD OF THE SAME

CROSS-REFERENCE TO RELATED APPLICATIONS

This application claims priority to Korean Patent Application No. 10-2013-0028336, filed on Mar. 15, 2013, in the Korean Intellectual Property Office, the disclosure of which is incorporated by reference in its entirety herein.

BACKGROUND

1. Technical Field

The inventive concept relates to a multimedia system and a method of operating the same.

2. Discussion of Related Art

A system-on-chip (SoC) system, which includes an application processor (AP), may be used to process multimedia data to form a multimedia system. The multimedia system may include several modules for performing one or more functions to process the multimedia data. It may be inefficient to control all modules included in the multimedia system with a single special function register (SFR) and one synchronization logic. Further, when the whole system is controlled by the one synchronization logic, it may be difficult to perform high-performance operations.

SUMMARY

According to an exemplary embodiment of the inventive concept, a multimedia system includes a main special function register (SFR) configured to store SFR information; a plurality of processing modules each configured to process frames of data, based on the SFR information; and a system control logic configured to control operations of the main SFR and the plurality of processing modules. The plurality of processing modules may process data of different frames at the same time period.

Each of the plurality of processing modules may operate in synchronization with module frame identification (ID) thereof.

The SFR information may include frame synchronization information and non-frame synchronization information, and the plurality of processing modules may process the data using independent clock signals and separate parts of the frame synchronization information.

Each of the plurality of processing modules may include a power/clock manager configured to control clock-gating and power-gating of the processing module.

The multimedia system may further include a starter module configured to set a stream path including stream processing modules for processing the data among the plurality of processing modules. The starter module may set a module frame ID of each of the respective stream processing modules.

Each of the plurality of processing modules may include a frame synchronization manager configured to determine whether processing of a subsequent frame of the data is to be started, a frame SFR configured to receive and store frame synchronization information transmitted from the main SFR, and a data processing logic configured to process the data in units of frames, based on the frame synchronization information stored in the frame SFR.

When the frame synchronization manager determines that the processing of the subsequent frame is to be started, the frame SFR may receive the frame synchronization information corresponding to the subsequent frame from the main SFR, store the frame synchronization information, and maintain the frame synchronization information until the frame synchronization manager determines that the processing of another subsequent frame is to be started.

The main SFR may store an ID of a most recent frame among frames processed by the stream processing modules as recent frame ID, and store the frame synchronization information corresponding to the recent frame ID.

When processing of data corresponding to the module frame ID is completed, the frame synchronization manager may increase the module frame ID and transmit the increased module frame ID to the system control logic. The system control logic may control the frame synchronization manager to start processing of the subsequent frame when the module frame ID and the recent frame ID are the same.

If the module frame ID is greater than the recent frame ID, the system logic may generate an SFR update signal when all the stream processing modules receive the frame synchronization information corresponding to the recent frame ID, and the main SFR may update the frame synchronization information and the recent frame ID according to the SFR update signal.

If the module frame ID is greater than the recent frame ID, the system logic may generate a recent frame ID update signal after a predetermined time period passes when all the stream processing modules receive the frame synchronization information corresponding to the recent frame ID.

When each of the stream processing modules receives and stores the frame synchronization information corresponding to each of the frames, each of the stream processing modules may transmit a module processing signal to the system control logic, and the system control logic may determine whether all the stream processing modules receive the frame synchronization information corresponding to the recent frame ID, according to the module processing signal.

The starter module may receive a stream start signal and initial frame ID from the system control logic, and transmit a stream request and the initial frame ID to the stream processing modules that provide the data to the starter module.

Each of the stream processing modules may receive the stream request and the initial frame ID from the starter module or another stream processing module, transmit the stream request and the initial frame ID to the other stream processing module when the stream processing module receives the data from the other stream processing module, store the initial frame ID as the module frame ID thereof, and receive frame synchronization information corresponding to the module frame ID.

According to an exemplary embodiment of the inventive concept, there is provided a method of operating a multimedia system, which is performed by each of processing modules, the method including receiving and storing frame synchronization information transmitted from a main special function register (SFR), and processing frames of data based on the frame synchronization information.

Each of the processing modules may process different frames of the data at the same point of time, operate in synchronization with module frame identification (ID) thereof, and be independently clock-gated and power-gated.

According to an exemplary embodiment of the inventive concept, a system includes a plurality of processing modules and a main special function register SFR. A first subset of the processing modules process a current frame of data upon being assigned a first frame identifier, and increment the first frame identifier to a second frame identifier after the processing. A second subset of the processing modules process a subsequent frame of data upon being assigned the second frame identifier. The main special function register SFR is configured to transmit information to the first subset of processing modules indicating whether each of the processing modules of the first subset is to operate in synchronization with the second frame identifier. In an exemplary embodiment, the second subset of processing modules sequentially performs operations on the second frame of data, and only the processing modules of the first subset that received information indicating they should operate, perform operations on an output of the sequential operations. In an exemplary embodiment, each of the plurality of processing modules includes a frame synchronization manager configured to determine whether processing of the subsequent frame is to be started, a frame SFR configured to receive and store the information transmitted from the main SFR, and a data processing logic configured to process each of the frames of the data, based on the information stored in the frame SFR. In an exemplary embodiment, the system further includes comprising system control logic configured to control operations of the main SFR and the plurality of processing modules. In an exemplary embodiment, when processing of data corresponding to the first frame identifier has completed, the frame synchronization manager increases the first frame identifier and transmits the increased frame identifier to the system control logic, and the system control logic controls the frame synchronization manager to start processing of the subsequent frame upon receipt of the increased frame identifier.

BRIEF DESCRIPTION OF THE DRAWINGS

Exemplary embodiments of the inventive concept will be more clearly understood from the following detailed description taken in conjunction with the accompanying drawings in which:

FIG. 9 illustrates an example of information stored in a system control logic;

DETAILED DESCRIPTION

The inventive concept now will be described more fully hereinafter with reference to the accompanying drawings, in which exemplary embodiments of the invention are shown. The inventive concept may, however, be embodied in many different forms and should not be construed as limited to the embodiments set forth herein. Like numbers refer to like elements throughout. As used herein, the singular forms “a”, “an”, and “the” are intended to include the plural forms as well, unless the context clearly indicates otherwise.

Hereinafter, the term “module” may indicate the functional or structural combination between hardware for performing a method according to at least one embodiment of the inventive concept and software for driving the hardware. Accordingly, the module may indicate a logical unit or group of a program code and a hardware resource (e.g., a processor) for performing the program code and does not necessarily indicate physically connected coders or a certain type of hardware.

Figure 1:
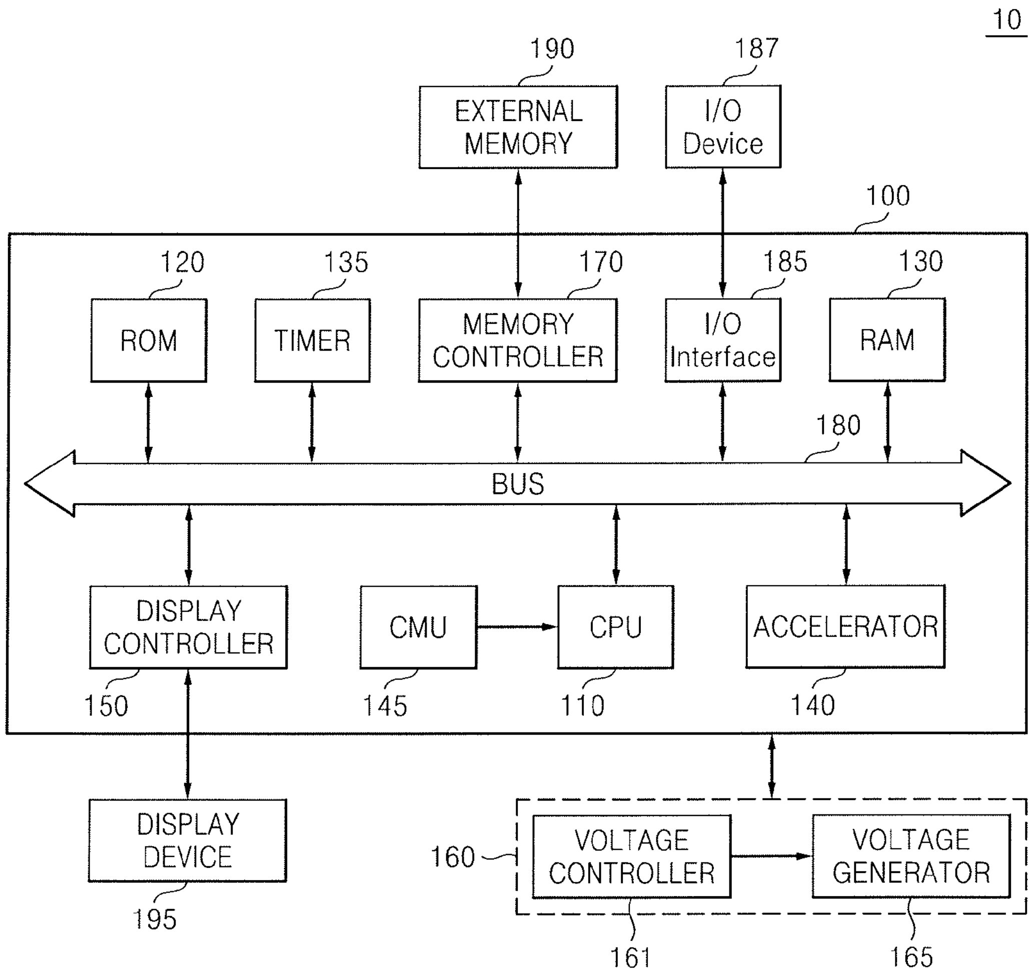
FIG. 1 is a block diagram of an electronic system according to an exemplary embodiment of the inventive concept.

FIG. 1 is a block diagram of an electronic system 10 according to an exemplary embodiment of the inventive concept.

Referring to FIG. 1, the electronic system 10 may be embodied as a handheld device, such as a mobile phone, a smart phone, a tablet computer, a personal digital assistant (PDA), an enterprise digital assistant (EDA), a digital still camera, a digital video camera, a portable multimedia player (PMP), a personal/portable navigation device (PND), a handheld game console, or an e-book reader.

The electronic system 10 includes a system-on-chip (SoC) 100, an input/output (I/O) device 187, a memory device 190, and a display device 195. The SoC 100 includes a central processing unit (CPU) 110, a read only memory (ROM) 120, a random access memory (RAM) 130, a timer 135, an accelerator 140, a clock management unit (CMU) 145, a display controller 150, a memory controller 170, a bus 180, and an I/O interface 185. Although not shown, the SoC 100 may further include other devices, e.g., a television (TV), a processor, etc. The electronic system 10 may further include a power management integrated circuit (PMIC) 160.

The PMIC 160 is disposed outside the SoC 100 in FIG. 1 but may be disposed inside the SoC 100 according to an embodiment of the inventive concept. The PMIC 160 includes a voltage controller 161 and a voltage generator 165.

The CPU 110 that may also be referred to as a processor may process or execute programs and/or data stored in the memory device 190 or an internal memory device such as memories 120 and 130. For example, the CPU 110 may process or execute the programs and/or data according to a clock signal output from a clock signal generator (not shown).

The CPU 110 may be embodied as a multi-core processor. The multi-core processor is one computing component including at least two independent and actual processors (referred to as cores). Each of the at least two processors is capable of reading and performing program instructions. Since the multi-core processor is capable of simultaneously driving a plurality of accelerators, a data processing system including the multi-core processor may perform multi-acceleration.

Programs and/or data stored in the ROM 120, the RAM 130, and the memory device 190 may be loaded to a memory of the CPU 110 if needed.

The ROM 120 may store permanent programs and/or data. The ROM 120 may be embodied as erasable programmable read-only memory (EPROM) or electrically erasable programmable read-only memory (EEPROM).

The RAM 130 may temporarily store programs, data, or instructions. For example, programs and/or data stored in the ROM 120 or the memory device 190 may be temporarily stored in the RAM 130, under control of the CPU 110 or according to a boot code stored in the ROM 120. The RAM 130 may be embodied as dynamic RAM (DRAM) or static RAM (SRAM).

The accelerator 140 may mean a hardware device or a co-processor configured to improve the performance of processing multimedia or multimedia data, e.g., text, audio, still images, animation, video, two-dimensional (2D) data, three-dimensional (3D) data, etc. For example, the accelerator 140 may be a graphic processing unit (GPU).

Although FIG. 1 illustrates only one accelerator 140 for convenience of explanation, the SoC 100 may include one or more accelerators according to an exemplary embodiment of the inventive concept. For example, at least one application program may execute one or more accelerators.

The CMU 145 generates an operating clock signal. The CMU 145 may include a clock generation device such as a phase-locked loop (PLL), a delayed locked loop (DLL), a crystal, etc.

The operating clock signal may be supplied to the CPU 110. Furthermore, the operating clock signal may be supplied to other elements, e.g., a memory controller, etc.

The voltage controller 161 may control the voltage generator 165. The voltage generator 165 may generate operating voltages for various elements of the SoC 100 and apply the operating voltages to these elements under control of the voltage controller 161.

The memory controller 170 is a block configured to interface with the memory device 190. The memory controller 170 controls overall operations of the memory device 190 and exchange of various data between a host (not shown) and the memory device 190. For example, the memory controller 170 writes data to or reads data from the memory device 190 according to a request from the host.

Here, the host may be a master device such as the CPU 110, the accelerator 140, or the display controller 150.

The I/O interface 185 is a block configured to interface with the I/O device 187. The I/O interface 185 may control exchange of various data between various elements of the SoC 100 and the I/O device 187.

The I/O device 187 may receive an input from a user or output data to the user. The I/O device 187 may be, for example, a touch screen.

The memory device 190 is a storage space for storing data and may store an operating system (OS), various computer programs, and various data (e.g., multimedia data such as images, movies, etc.). The memory device 190 may be DRAM but is not limited thereto. For example, the memory device 190 may be a nonvolatile memory device, e.g., a flash memory, a phase-change RAM (PRAM), a magneto-resistive RAM (MRAM), a resistive RAM (ReRAM), or a ferroelectric RAM (FeRAM). According to an exemplary embodiment of the inventive concept, the memory device 190 is a built-in memory installed in the SoC 100. These elements 110, 120, 130, 140, 150, 170, and 185 may communicate with one another via the system bus 180.

The display controller 150 may control an operation of the display device 195.

The display device 195 may display results provided from a soft accelerator loaded to the CPU 110 or multimedia data accelerated or processed by the accelerator 140, which is a hardware accelerator. As an exemplary embodiment, the display device 195 may be a light-emitting diode (LED), an organic LED (OLED) device, or another type of display device.

Figure 2:
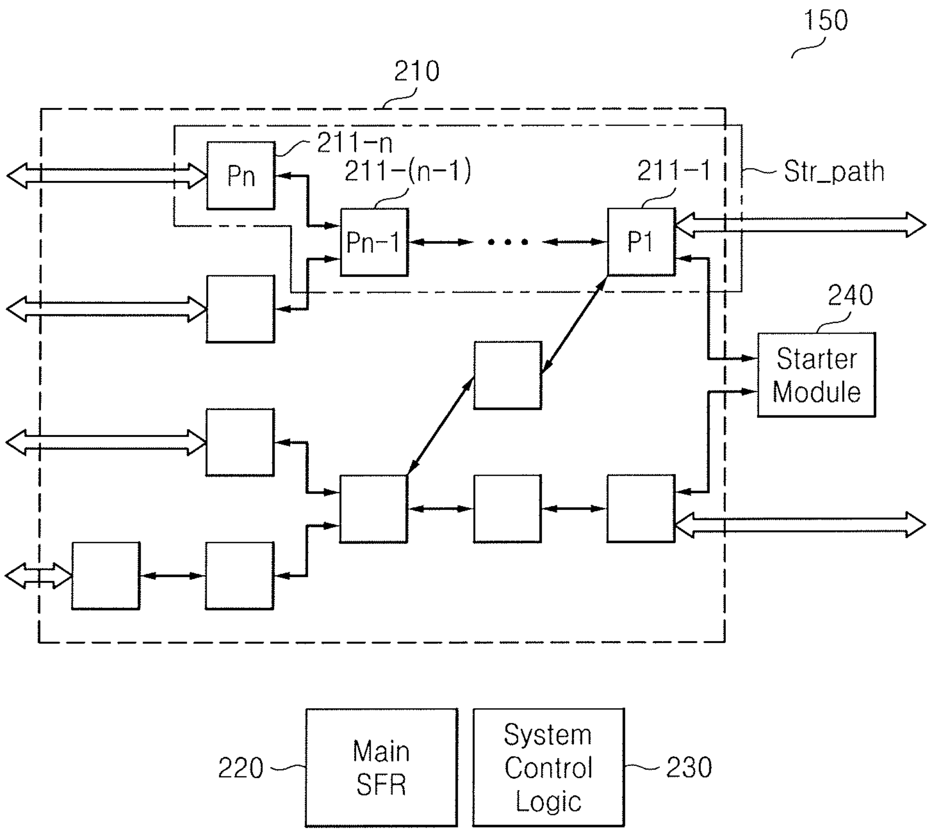
FIG. 2 is a block diagram of a multimedia system according to an exemplary embodiment of the inventive concept.

FIG. 2 is a block diagram of a multimedia system 150 according to an exemplary embodiment of the inventive concept.

Referring to FIGS. 1 and 2, the multimedia system 150 of FIG. 2 may correspond to the display controller 150 or the GPU 140 of FIG. 1. It is hereinafter assumed that the multimedia system 150 of FIG. 2 corresponds to the display controller 150 of FIG. 1.

The multimedia system 150 may include a plurality of processing modules 210, a main special function register (SFR) 220, a system control logic 230, and a starter module 240. The plurality of processing modules 210 process frames of data received from the outside (e.g., a source located external the SoC 100), based on SFR information.

Stream paths Str_path corresponding to the frames in the plurality of processing modules 210 are formed when frames of data are processed. Each of the stream paths Str_path means a sequence of processing modules 210 to which a frame that is to be currently processed by the multimedia system 150 will be moved. Different stream paths Str_path may be used for different frames. Hereinafter, processing modules P1 211-1, . . . , Pn−1 211-n−1), Pn 211-n included in one of the stream paths Str_path will be referred to as stream processing modules.

The plurality of stream processing modules P1 211-1 to Pn 211-n are capable of sequentially performing a different process on data. For example, the $n^{th}$ stream processing module 211-n may receive data from the outside and perform scaling on the data, and the $(n-1)^{th}$ stream processing module 211-(n−1) may perform blending on the data scaled by the $n^{th}$ processing module 211-n. The first stream processing module 211-1 may finally process data processed sequentially by the $n^{th}$ stream processing module 211-n to the second stream processing module 211-2 and output a processing result to the outside.

The plurality of processing modules 210 may be each assigned different module frame identifications (IDs) and process data of each frame corresponding to the module frame IDs thereof, respectively. Thus, the plurality of processing modules 210 may process data of different frames at the same point of time, respectively.

The main SFR 220 may receive SFR information needed to process the data from the outside and store the SFR information. The SFR information may include frame synchronization information to be synchronized in units of frames, and non-frame synchronization information that does not need to be synchronized in units of frames. Examples of the frame synchronization information may include image size, e.g., 1024×768, a color format, e.g., RGB or YCbCr, etc.

The main SFR 220 may transmit the SFR information to the plurality of processing modules 210.

The system control logic 230 controls operations of the plurality of processing modules 210, the main SFR 220, and the starter module 240. The system control logic 230 may include a table for storing information regarding states of the plurality of processing modules 210.

The starter module 240 may set the stream path Str_path under control of the system control logic 230. The starter module 240 may set the module frame IDs assigned to the respective stream processing modules P1 211-1 to Pn 211-n included in the stream path Str_path.

The elements 211-1 to 211-n, 220, 230, and 240 included in the multimedia system 150 may operate asynchronously or synchronously. For example, the elements 211-1 to 211-n, 220, 230, and 240 may operate in synchronization with clock signals, respectively. The clock signals may be different from one another.

Figure 3:
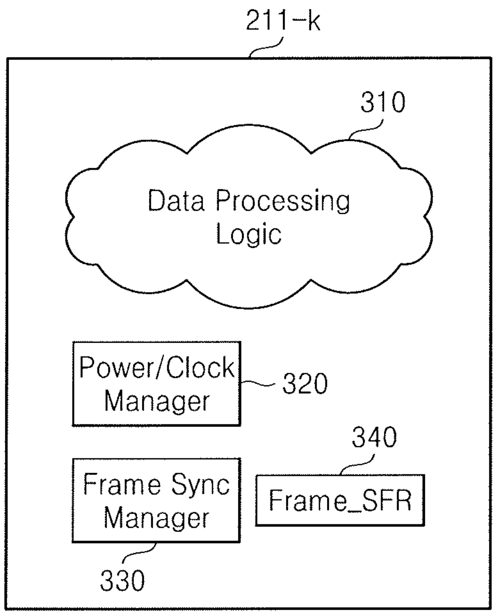
FIG. 3 is a block diagram of processing modules illustrated in FIG. 2.

FIG. 3 is a block diagram of each of the processing modules 211-k such as the processing modules illustrated in FIG. 2, according to an exemplary embodiment of the inventive concept.

Referring to FIGS. 2 and 3, each of the processing modules 211-k includes a data processing logic 310, a power/clock manager 320, a frame synchronization manager 330, and a frame SFR 340. Here, 'k' denotes a natural number that is less than or equal to the number of processing modules.

The data processing logic 310 processes data in units of frames, based on frame synchronization information stored in the frame SFR 340 and non-frame synchronization information received from the main SFR 220.

The power/clock manager 320 controls clock-gating and power-gating of the processing module 211-k. That is, the power/clock manager 320 may control supply of a clock signal and power to the elements 310, 330, 340 included in the processing module 211-k.

The frame synchronization manager 330 determines whether processing of a subsequent frame of the data is to be started. The frame synchronization manager 330 may store a module frame ID of the corresponding processing module 211-k. The processing modules 211-k may operate in synchronization with the module frame IDs thereof.

In an exemplary embodiment, the frame synchronization manager 330 increases the module frame ID when the data processing logic 310 completes processing of a current frame. When the increased module frame ID is equal to a recent frame ID, the frame synchronization manager 330 controls the frame SFR 340 to receive and store frame synchronization information corresponding to the increased module frame ID. Then, the frame synchronization manager 330 controls the data processing logic 310 to start processing of a frame corresponding to the increased module frame ID. The recent frame ID will be described in detail with reference to FIG. 4 below, for convenience of explanation.

The frame SFR 340 receives the frame synchronization information from the main SFR 220 and stores the frame synchronization information, based on the module frame ID. When the frame synchronization manager 330 determines that processing of the subsequent frame is to be started, the frame SFR 340 receives frame synchronization information corresponding to the subsequent frame from the main SFR 220, stores the frame synchronization information, and maintains the frame synchronization information until the frame synchronization manager 330 determines that processing of another subsequent frame is to be started. Thus, even if the main SFR 220 or the frame SFR 340 of another processing module is updated, the frame SFR 340 may independently operate without being influenced by the updating.

The module frame IDs assigned to the respective processing modules 211-k may be different from one another. Thus, the plurality of processing modules 211-k may process data of different frames at the same point of time. Since the processing modules 211-k include different power/clock managers 320 and different frames SFR 340, the data may be processed using independent clock signals and independent frame synchronization information.

The structure of the starter module 240 may be the same as those of the processing modules 211-k. In other words, similarly, the starter module 240 may include the data processing logic 310, the power/clock manager 320, the frame synchronization manager 330, and the frame SFR 340, and store module frame ID thereof.

Figure 4:
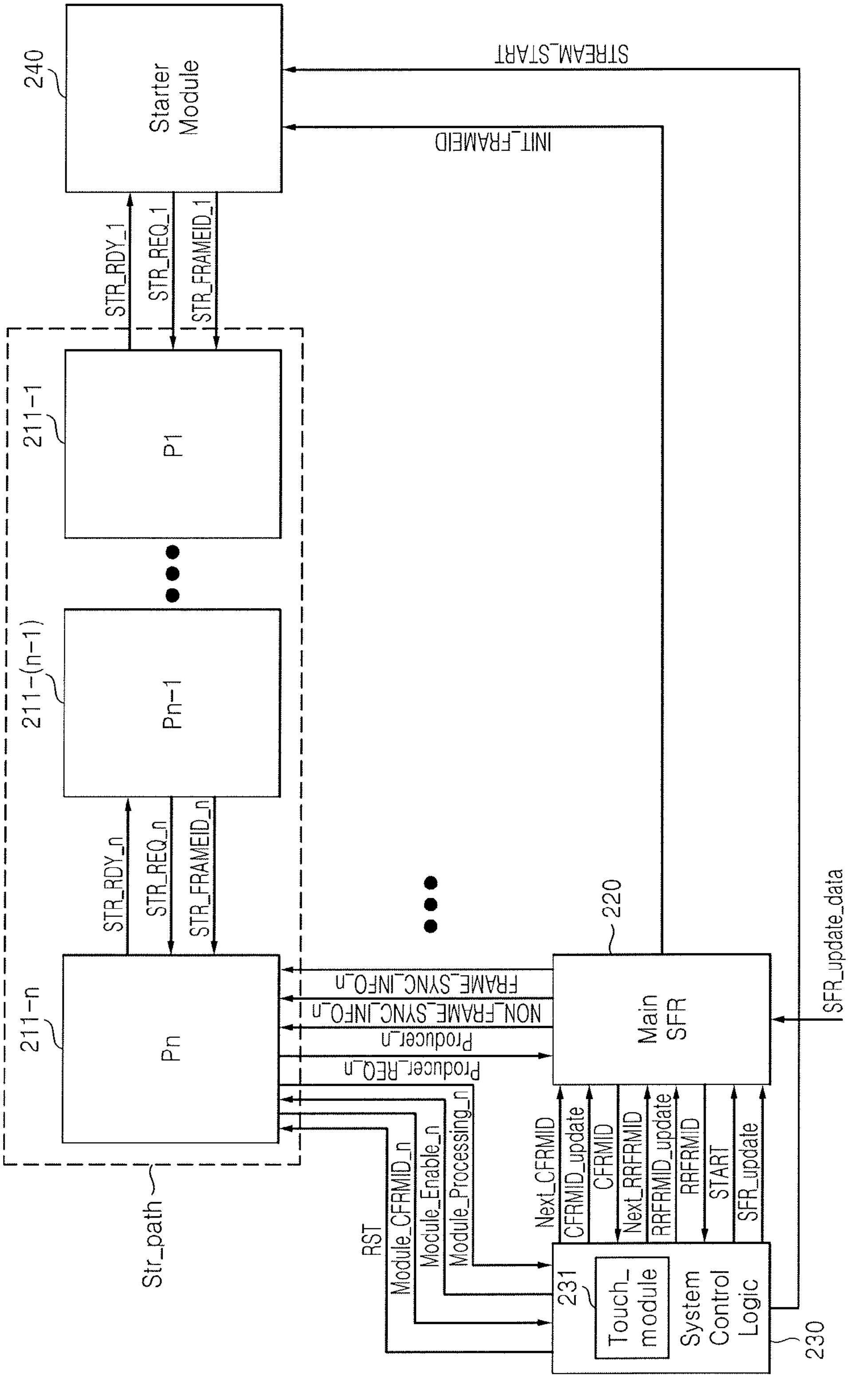
FIG. 4 is a detailed block diagram of the multimedia system of FIG. 2 according to an exemplary embodiment of the inventive concept.
Figure 5:
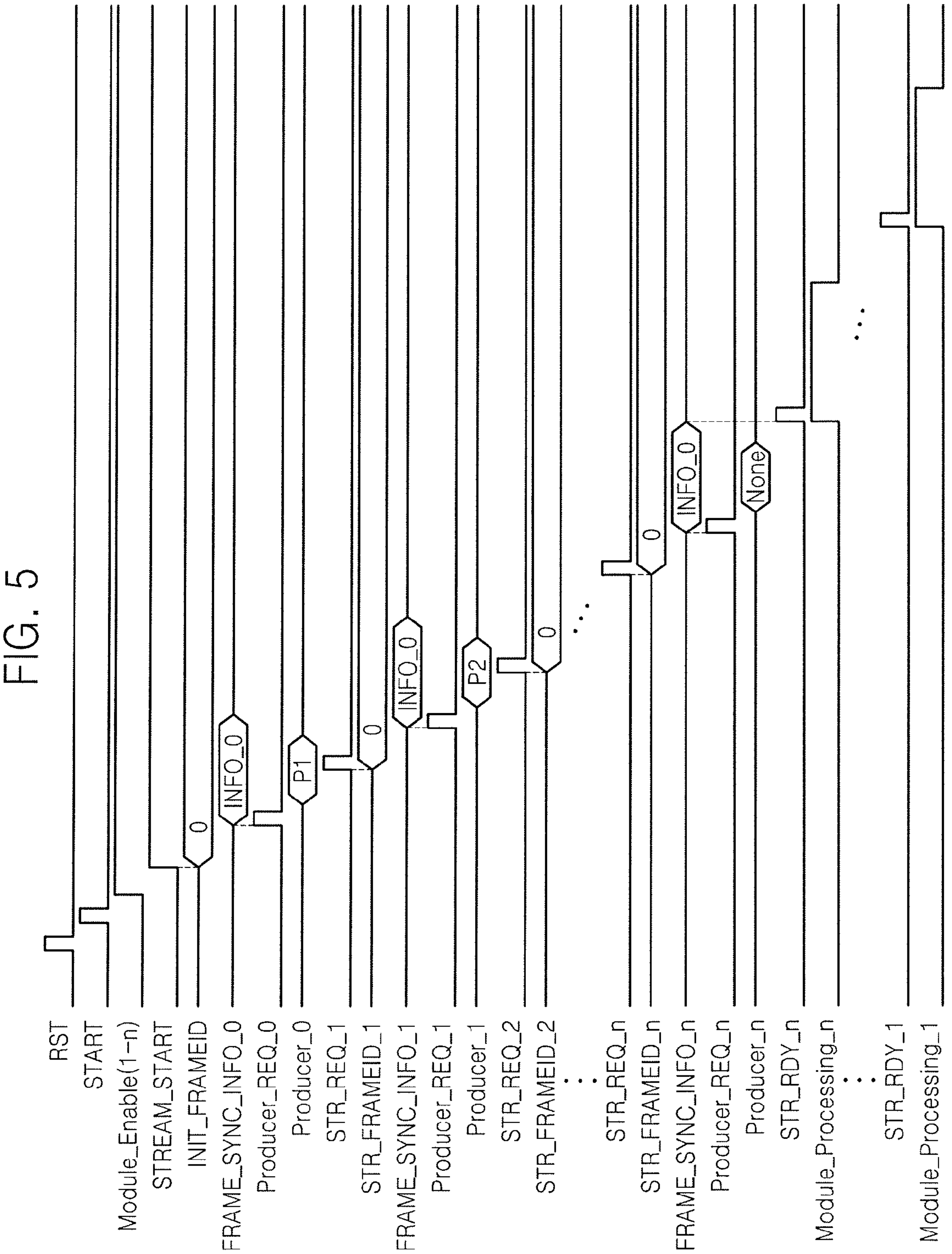
FIG. 5 is a timing diagram illustrating a process of setting a stream path of FIG. 4 according to an exemplary embodiment of the inventive concept.

FIG. 4 is a detailed block diagram of the multimedia system of FIG. 2 according to an exemplary embodiment of the inventive concept. FIG. 5 is a timing diagram illustrating a process of setting a stream path of FIG. 4 according to an exemplary embodiment of the inventive concept.

Referring to FIGS. 2 to 5, n processing modules 211-1 to 211-n among the plurality of processing modules 210 (hereinafter referred to as the P1 211-1 to the Pn 211-n for convenience of explanation) may be included in a stream path Str_path corresponding to an initial frame ID INIT_FRAMEID. Here, 'n' denotes an integer that is equal to or greater than '2'.

Although FIG. 4 illustrates signals exchanged among the Pn 211-n, the system control logic 230 and the main SFR 220, the Pn−1 211-(n−1) to the P1 211-1 and the starter module 240 may exchange the signals corresponding to the signals of Pn 211-n with the system control logic 230 and the main SFR 220. For example, the Pn−1 211-(n−1) to the P1 211-1 and the starter module 240 may transmit module frame IDs Module_CFRMID_n−1 to Module_CFRMID_0 thereof to the system control logic 230.

FIGS. 4 and 5 do not illustrate all signals that can be exchanged between the elements 211-1 to 211-n, 220, 230, and 240. For example, it should be understood that when the system control logic 230 controls the Pn 211-n, the system control logic 230 may transmit control signals to the Pn 211-n via signal lines illustrated in FIG. 4 or via additional signal lines.

In the present disclosure, a processing module that operates as a data source in the stream path Str_path will be referred to as a producer and a processing module that consumes data will be referred to as a consumer. For example, when data is supplied in the order of the processing modules 211-n, 211-(n−1), . . . , 211-3, 211-2, and 211-1, a producer of the second processing module 211-2 is the third processing module 211-3 and a consumer of the second processing module 211-2 is the first processing module 211-1. In this case, a final consumer of the stream path Str_path is always the starter module 240.

A process of setting the stream path Str_path using the starter module 240 will now be described.

The main SFR 220 receives a multimedia process request (not shown) from the outside, e.g., a CPU, according to a user input, and transmits this request to the system control logic 230. The system control logic 230 initializes all the processing modules 210 by supplying a reset signal RST thereto according to the multimedia process request.

The system control logic 230 determines that the first processing module 211-1 to the $n^{th}$ processing module 211-n are to be set as stream processing modules among the processing modules 210, according to the multimedia process request.

Then, the system control logic 230 transmits an SFR start signal START to the main SFR 220, and module enable signals Module_Enable_1 to Module_Enable_n to the stream processing modules 211-1 to 211-n and the starter module 240.

The system control logic 230 may also transmit the module enable signal Module_Enable to the remaining modules other than the stream processing modules 211-1 to 211-n. In this case, the module enable signal Module_Enable transmitted to the stream processing modules 211-1 to 211-n may be in a first logic level, e.g., a logic high level, and the module enable signal Module_Enable transmitted to the remaining processing modules may be in a second logic level, e.g., a logic low level.

The power/clock manager 320 of each of the stream processing modules 211-1 to 211-n and the starter module 240 starts supply of a clock signal to the frame synchronization manager 330 corresponding thereto according to the module enable signal Module_Enable. It should be hereinafter understood that the stream processing modules 211-n to 211-1 and the starter module 240 are operated by the frame synchronization managers 330 included in the respective stream processing modules 211-n to 211-1 and starter module 240 before the clock signal is supplied to the data processing units 310 of the respective stream processing modules 211-n to 211-1 and the starter module 240, unless otherwise specified.

Then, the system control logic 230 transmits a stream start signal STREAM_START to the starter module 240, and transmits an initial frame ID INIT_FRAMEID to the starter module 240 via the main SFR 220. It is hereinafter assumed that the initial frame ID INIT_FRAMEID is ‘0’.

The main SFR 220 may store a current frame ID CFRMID, and a recent reference frame ID RRFRAMEID.

The current frame ID CFRMID means a module frame ID of the starter module 240 which is located at the back of the multimedia system 150, that is, which is a last consumer. In other words, the current frame ID CFRMID is an ID of an oldest frame among frames that are being processed in the multimedia system 150.

The recent frame ID RRFRAMEID means an ID of a most recent frame that is being processed in the multimedia system 150.

The main SFR 220 may set the current frame ID CFRMID and the recent frame ID RRFRAMEID as initial frame IDs INIT_FRAMEID according to the SFR start signal START. The main SFR 220 may receive frame synchronization information corresponding to the recent frame ID RRFRMID from the outside and store this information whenever the recent frame ID RRFRMID is set or updated.

The starter module 240 sets a module frame ID Module_CFRMID_0 thereof as the initial frame ID INIT_FRAMEID. Then, the starter module 240 receives starter frame synchronization information FRAME_SYNC_INFO_0 corresponding to the module frame ID Module_CFRMID_0 thereof from the main SFR 220, stores this information in the frame SFR 340 thereof, and transmits a starter producer request signal Producer_REQ_0 to the main SFR 220. The frame SFR 340 of the starter module 240 maintains the starter frame synchronization information FRAME_SYNC_INFO_0 until the frame synchronization manager 330 of the starter module 240 determines that processing of a subsequent frame is to be started.

The main SFR 220 determines the P1 211-1 as a producer of the starter module 240 according to the starter producer request signal Producer_REQ_0, and transmits a starter producer signal Producer_0 indicating that the P1 211-1 is the producer to the starter module 240.

The starter module 240 transmits a first stream request STR_REQ_1 to the P1 211-1 according to the starter producer signal Producer_0, sets a first stream frame ID STR_FRAMEID_1 as the module frame ID Module_CFRMID_0 thereof, and transmits the first stream frame ID STR_FRAMEID_1 to the P1 211-1.

The P1 211-1 sets a module frame ID Module_CFRMID_1 thereof as the first stream frame ID STR_FRAMEID_1. Then, the P1 211-1 receives first frame synchronization information FRAME_SYNC_INFO_0 corresponding to the module frame ID Module_CFRMID_1 thereof from the main SFR 220, stores this information in the frame SFR 340 thereof, and transmits a first producer request signal Producer_REQ_1 to the main SFR 220. The frame SFR 340 of the P1 211-1 maintains the first frame synchronization information FRAME_SYNC_INFO_1 until the frame synchronization manager 330 of the P1 211-1 determines that processing of a subsequent frame is to be started.

The main SFR 220 determines that the P2 211-2 is a producer of the P1 211-1 and transmits a first producer signal Producer_1 including information indicating that the P2 211-2 is the producer to the P1 211-1, according to the first producer request signal Producer_REQ_1.

The P1 211-1 transmits a second stream request STR_REQ_2 to the P2 211-2, sets a second stream frame ID STR_FRAMEID_2 as the module frame ID Module_CFRMID_1 thereof, and transmits the second stream frame ID STR_FRAMEID_2 to the P2 211-2, according to the first producer signal Producer_1.

The operations of the P2 211-2 to the Pn−1 211-(n−1) may be the same as that of the P1 211-1 described above and is thus not redundantly described here.

The Pn 211-n receives an $n^{th}$ stream request STR_REQ_n and an $n^{th}$ stream frame ID STR_FRAMEID_n. The Pn 211-n sets a module frame ID Module_CFRMID_n thereof as the $n^{th}$ stream frame ID STR_FRAMEID_n. Then, the Pn 211-n receives $n^{th}$ frame synchronization information FRAME_SYNC_INFO_n corresponding to the module frame ID Module_CFRMID_n thereof from the main SFR 220, stores this information in the frame SFR 340 thereof, and transmits an $n^{th}$ producer request signal Producer_REQ_n to the main SFR 220. The frame SFR 340 of the Pn 211-n maintains the $n^{th}$ frame synchronization information FRAME_SYNC_INFO_n until the frame synchronization manager 330 of the Pn 211-n determines that processing of a subsequent frame is to be started.

The main SFR 220 determines that a producer of the Pn 211-n is not present and transmits an $n^{th}$ producer signal Producer_n including information indicating that a producer of the Pn 211-n is not present to the Pn 211-n, according to the $n^{th}$ producer request signal Producer_REQ_n.

The Pn 211-n receives the $n^{th}$ producer signal Producer_n and determines that a producer of the Pn 211-n is not present. Thus, after the receiving of the $n^{th}$ frame synchronization information FRAME_SYNC_INFO_n ends, the Pn 211-n transmits an $n^{th}$ stream ready signal STR_RDY_n to the Pn−1 211-(n−1), and starts processing of the data. The power/clock manager 320 included in the Pn 211-n starts supply of a clock signal to the data processing logic 310 corresponding thereto according to the $n^{th}$ stream ready signal STR_RDY_n.

The Pn 211-n transmits an $n^{th}$ module processing signal Module_Processing_n to the control logic 230. The $n^{th}$ module processing signal Module_Processing_n may have a first logic level, e.g., a logic high level, while the Pn 211-n processes the data, and may have a second logic level, e.g., a logic low level, while the Pn 211-n does not process the data.

The Pn−1 211-(n−1) may receive the $n^{th}$ stream ready signal STR_RDY_n from the Pn 211-n, transmit an $(n-1)^{th}$ stream ready signal STR_RDY_(n−1) to the Pn−1 211-(n−2) when receiving of an $(n-1)^{th}$ frame synchronization information FRAME_SYNC_INFO_(n−1) ends, and start processing of the data. The power/clock manager 320 included in the Pn 211-(n−1) starts supply of a clock signal to the data processing logic 310 corresponding thereto according to an $(n-1)^{th}$ stream ready signal STR_RDY_(n−1). The Pn−1 211-(n−1) transmits an $(n-1)^{th}$ module processing signal Module_Processing_(n−1) to the control logic 230. The $(n-1)^{th}$ module processing signal Module_Processing_(n−1) may have a first logic level, e.g., a logic high level, while the Pn−1 211-(n−1) processes the data, and may have a second logic level, e.g., a logic low level, while the Pn−1 211-(n−1) does not process the data.

The operations of the P1 211-1 may be the same as that of the Pn−1 211-(n−1) described above and is thus not redundantly described here.

When the starter module 240 receives a first stream ready signal STR_RDY_1 from the P1 211-1, the setting of the stream path Str_path is completed. In this case, all the processing modules 211-1 to 211-n are ready to transmit the data and are assigned the same module frame ID. The process of setting the stream path Str_path described above is referred to as stream building.

Figure 6:
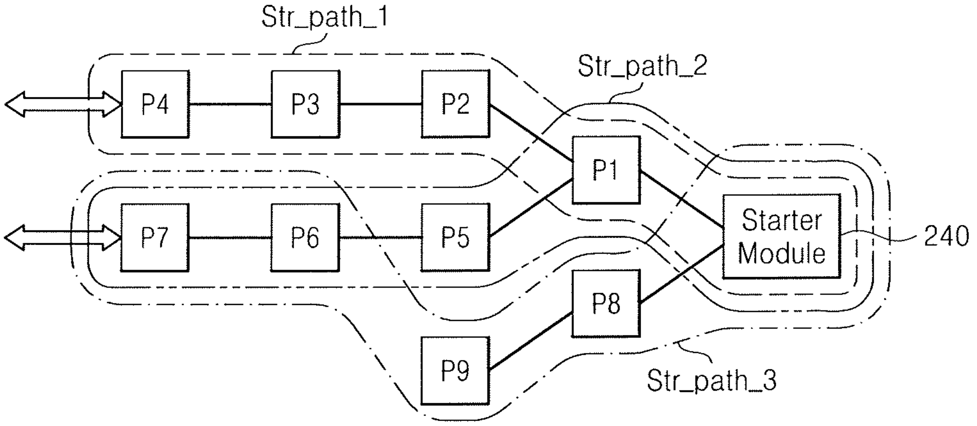
FIG. 6 is a diagram illustrating examples of changing a stream path.
Figure 7:
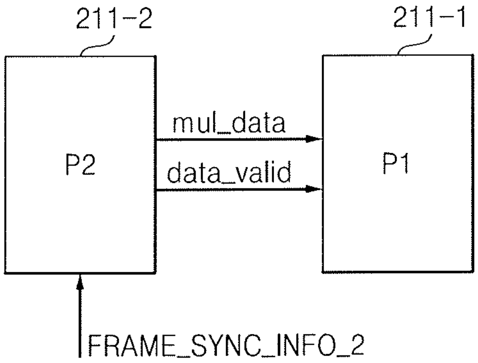
FIG. 7 is a diagram illustrating an exemplary transmission of data between stream processing modules.

FIG. 6 is a diagram illustrating examples of changing a stream path. FIG. 7 is a diagram illustrating transmission of data between stream processing modules.

Referring to FIGS. 4 to 7, it is assumed that a first stream path Str_path_1 for processing a first frame of data is {P4, P3, P2, P1}, a second stream path Str_path_2 for processing a second frame of the data is {P7, P6, P5, P1}, and a third stream path Str_path_3 for processing a third frame of the data is {P7, P6, P9, P8}.

The first stream path Str_path_1 may be set using the process described above with reference to FIGS. 4 and 5. It is assumed that an initial module frame ID Module_CFRMID assigned to the processing modules P4, P3, P2, and P1 in the first stream path Str_path_1 is '1'.

After the processing modules P4, P3, P2, and P1 in the first stream path Str_path_1 process the data, the initial module frame ID Module_CFRMID assigned thereto is increased by '1'. Thus, the module frame ID Module_CFRMID assigned to the processing modules P4, P3, P2, and P1 is changed to '2'.

After the module frame ID Module_CFRMID assigned to the processing modules P4, P3, P2, and P1 is increased by '1', the processing modules P4, P3, P2, and P1 receive frame synchronization information FRAME_SYNC_INFO corresponding thereto from the main SFR 230. The frame synchronization information FRAME_SYNC_INFO includes information indicating whether each of the processing modules P4, P3, P2, and P1 corresponding thereto operates in synchronization with the module frame ID Module_CFRMID thereof.

Each of the processing modules P4, P3, P2, and P1 determines whether itself operates in synchronization with the module frame ID Module_CFRMID thereof, based on the frame synchronization information FRAME_SYNC_INFO. At the module frame ID '2', the processing modules P2 to P4 do not operate and only the processing module P1 operates.

Each of the processing modules P1 to P9 transmit data mul_data processed by itself and valid data bits data_valid to a consumer thereof. The processing modules P1 to P9 may set the valid data bits data_valid to be in a first logic level, e.g., a logic high level, when the processing modules P1 to P9 operate in synchronization with module frame IDs thereof, and may set the valid data bits data_valid to be in a second logic level, e.g., a logic low level, when the processing modules P1 to P9 do not operate in synchronization with the module frame IDs thereof.

Thus, since the processing module P4 does operate in synchronization with the frame ID 2, the processing module P4 transmits data that is a logic low to the processing module P3 which is a consumer thereof. Since the processing module P3 does not operate in synchronization with the frame ID 2, the processing module P3 transmits data that is logic low to the processing module P2 which is a consumer thereof. Since the processing module P2 does not operate in synchronization with the frame ID 2, the processing module P2 transmits data that is logic low to the processing module P1 which is a consumer thereof. Then, the power/clock manager 320 of each of the processing modules P4 to P2 may suspend the supply of a clock signal to the data processing logic 310.

Although the processing module P1 operates in synchronization with the frame ID 2, the processing module P1 receives valid data bits data_valid that are logic low from the processing module P2 which is a producer thereof. Since the processing module P1 receives the valid data bits data_valid that are logic low, the processing module P2 does not receive data mul_data and starts stream building at the frame ID 2, starting from the processing module P5 which is a producer of the processing module P1.

That is, the processing module P1 transmits the first producer request signal Producer_REQ_1 to the main SFR 220.

The main SFR 220 determines that the processing module P5 is a producer of the processing module P1 according to the first producer request signal Producer_REQ_1, and transmits a first producer signal Producer_1 including information that the processing module P5 is a producer of the processing module P1, to the processing module P1. The processing module P1 sets module frame ID Module_CFRMID thereof as stream frame ID STR_FRAMEID, and transmits a stream request STR_REQ and the stream frame ID STR_FRAMEID to the processing module P5 according to the first producer signal Producer_1.

The processing module P5 sets the received stream frame ID STR_FRAMEID, e.g., '2', as module frame ID Module_CFRMID thereof, and then operates similar to the processing module P1. Similarly, the processing modules P6 and P7 operate to set the second stream path Str_path_2. Thereafter, the data mul_data may be delivered along the second stream path Str_path_2.

Each of the processing modules P7, P6, P5, and P1 included in the second stream path Str_path_2 processes data and then increases the module frame ID Module_CFRMID thereof by '1'. Thus, the module frame IDs Module_CFRMID of the respective processing modules P7, P6, P5, and P1 are '3'.

The processing module P6 transmits valid data bits data_valid that are logic high to the processing module P5. However, the processing module P5 transmits valid data bits data_valid that are logic low to the processing module P1, and the processing module P1 transmits valid data bits data_valid that are logic to the starter module 240.

Since the starter module 240 receives the valid data bits data_valid that are logic low, the starter module 240 does not receive data mul_data from the processing module P1 and starts stream building at frame ID 3, starting from the processing module P8 which is a producer of the starter module 240.

A stream building process is as described above. Thus, the third stream path Str_path_3 is set. Then, the data mul_data may be delivered along the third stream path Str_path_3.

Figure 8:
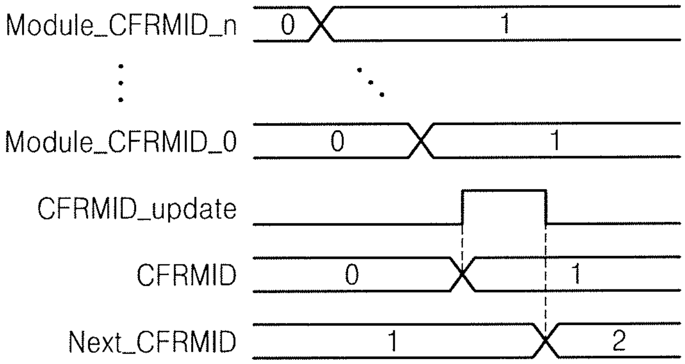
FIG. 8 is a timing diagram illustrating a process of updating a module frame identification (ID) of several processing modules and a current frame ID according to an exemplary embodiment of the inventive concept.

FIG. 8 is a timing diagram illustrating a process of updating module frame ID of each of processing modules and current frame ID according to an exemplary embodiment of the inventive concept.

Referring to FIGS. 4 and 8, it is assumed that module frame IDs Module_CFRMID_n to Module_CFRMID_1 of respective processing modules Pn to P1 are '0' and the processing modules Pn to P1 process data of frame ID 0 according to the module frame IDs Module_CFRMID_n to Module_CFRMID_1, respectively. The processing modules Pn to P1 sequentially complete the processing of the data of the frame ID 0 and increase the module frame IDs Module_CFRMID_n to Module_CFRMID_1 thereof from '0' to '1'.

When the starter module 240 receives the data from the first processing module P1, the starter module 240 increases module frame ID Module_CFRMID_0 thereof from '0' to '1'.

The processing modules Pn to P1 and the starter module 240 output the module frame IDs Module_CFRMID_n to Module_CFRMID_0 thereof to the system control logic 230, respectively.

The system control logic 230 may receive and store the module frame IDs Module_CFRMID_n to Module_CFRMID_0 of the respective processing modules Pn to P1 and starter module 240. When the module frame ID Module_CFRMID_0 of the starter module 240 is changed from '0' to '1', the system control logic 230 may transmit a current frame ID update signal CFRMID_update and next frame ID Next_CFRMID to the main SFR 220. The main SFR 220 updates current frame ID CFRMID to the next frame ID Next_CFRMID according to the current frame ID update signal CFRMID_update. Then, the next frame ID Next_CFRMID is increased by '1'.

FIG. 9 illustrates an example of information stored in a system control logic.

Referring to FIGS. 2, 4, and 9, it is assumed that the processing modules P4, P3, P2, and P1 are used to process frames '0' to '3'. That is, stream processing modules are the processing modules P4, P3, P2, and P1.

The system control logic 230 may receive and store module frame IDs Module_CFRMID from the respective plurality of processing modules 210.

As described above, the system control logic 230 transmits a module enable signal Module_Enable to the plurality of processing modules 210. A module enable signal Module_Enable transmitted to the stream processing modules P4, P3, P2, and P1 has a value that is in a first logic level, e.g., a logic high level, and a module enable signal Module_Enable transmitted to the other processing modules may have a value that is in a second logic level, e.g., a logic low level. The system control logic 230 may store the module enable signal Module_Enable corresponding to a current frame ID CFRMID and transmitted to these processing modules.

The system control logic 230 may store touch values Touch corresponding to respective current frame IDs CFRMID of these processing modules.

The touch values Touch of the respective processing modules may be set to be logic high when all the stream processing modules P4, P3, P2, and P1 receive and store frame synchronization information FRAME_SYNC_INFO corresponding to the current frame IDs CFRMID thereof. For example, the touch values Touch may be set to be logic high when a module processing signal Module_Processing is changed from logic low to logic high while the stream processing modules P1 to P4 have module frame IDs Module_CFRMID that are the same current frame ID CFRMID.

Touch values Touch of processing modules that do not belong to a stream path Str_path are set to be logic high.

The touch values Touch may be set to be logic low when all the stream processing modules P4, P3, P2, and P1 do not store the frame synchronization information FRAME_SYNC_INFO corresponding to the current frame ID CFRMID.

Figure 10:
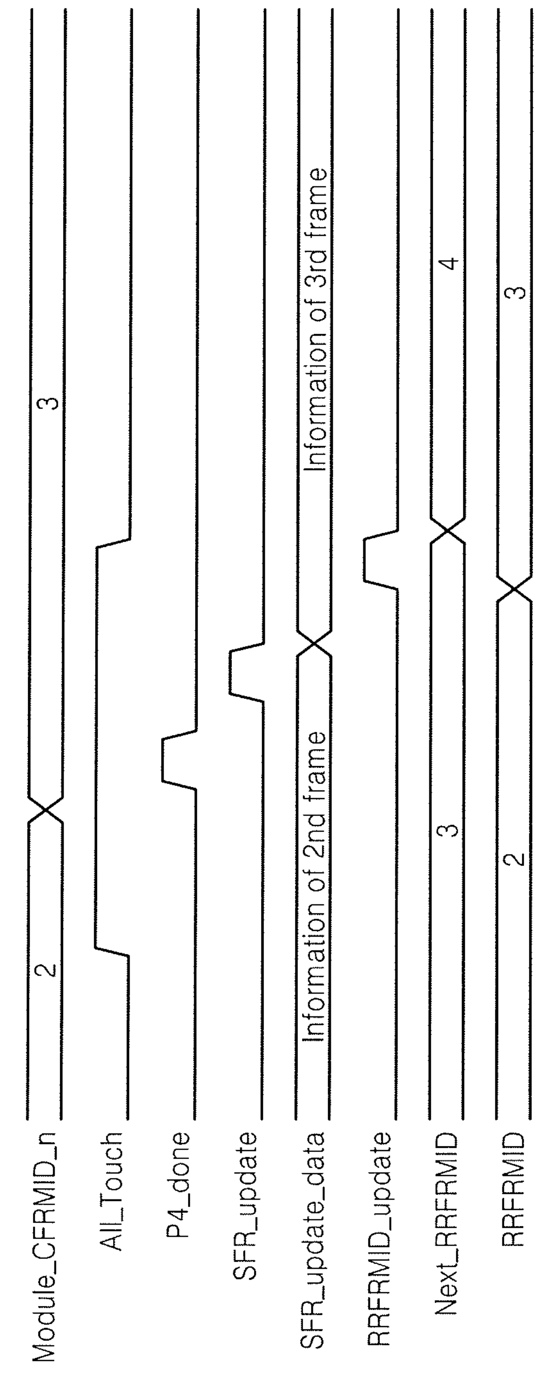
FIG. 10 is a timing diagram illustrating a process of updating a recent frame ID stored in a main special function register (SFR) according to an exemplary embodiment of the inventive concept.

FIG. 10 is a timing diagram illustrating a process of updating recent frame ID stored in a main SFR according to an exemplary embodiment of the inventive concept. Referring to FIGS. 4, 9, and 10, the stream processing modules P4, P3, P2, and P1 may process data of a second frame. In this case, the main SFR 220 may store frame synchronization information corresponding to the second frame, and a current frame ID CFRMID and a recent frame ID RRFRMID stored in the main SFR 220 may be '2'.

The system control logic 230 receives the current frame ID CFRMID and the recent frame ID RRFRMID from the main SFR 220.

It is assumed that the stream processing module P4 among the stream processing modules P1 to P4 first processes data of the second frame. In this case, the steam processing module P4 updates module frame ID Module_CFRMID_4 to '3' and transmits the updated module frame ID Module_CFRMID_4 and a P4 work-done signal P4_done to the system control logic 230.

The system control logic 230 compares the module frame ID Module_CFRMID_4 and the recent frame ID RRFRMID with each other. When the module frame ID Module_CFRMID_4 and the recent frame ID RRFRMID are the same, the system control logic 230 may control the frame synchronization manager 330 of the steam processing module P4 to determine that processing of data of a third frame is to be started.

However, when the module frame ID Module_CFRMID_4 is greater than the recent frame ID RRFRMID, the main SFR 220 should be updated. That is, in order to allow the stream processing module P4 to process the data of the third frame, first, the frame synchronization information stored in the main SFR 220 should be updated to correspond to the third frame. Since the main SFR 220 stores the recent frame ID RRFRMID, i.e., the frame synchronization information corresponding to the second frame, the system control logic 230 determines that the main SFR 220 should be updated.

The system control logic 230 checks whether each of the stream processing modules P1 to P4 receives and stores the frame synchronization information corresponding to the second frame, before the main SFR 220 is updated. For example, when touch values Touch of respective processing modules are logic high, a pulse may be generated in all touch signals all_touch. The system control logic 230 determines that the respective stream processing modules P1 to P4 receive and store the frame synchronization information corresponding to the second frame based on the pulse, and transmits an SFR update signal SFR_update to the main SFR 220. The main SFR 220 receives SFR update data SFR_update_data from the outside according to the SFR update signal SFR_update. The main SFR 220 stores a next recent frame ID Next_RRFRMID, i.e., the frame synchronization information corresponding to the third frame, which is included in the SFR update data SFR_update_data.

Then, the main SFR 220 receives a recent frame ID update signal RRFRMID_update and a next recent frame ID Next_RRFRMID from the system control logic 230, and updates the recent frame ID RRFRMID to the next RRFRMID Next_RRFRMID according to the recent frame ID update signal RRFRMID_update. Thus, since both the module frame ID Module_CFRMID_4 and the recent frame ID RRFRMID become '3', the stream processing module P4 may receive the frame synchronization information corresponding to the third frame from the main SFR 220, and process the data of the third frame.

Figure 11:
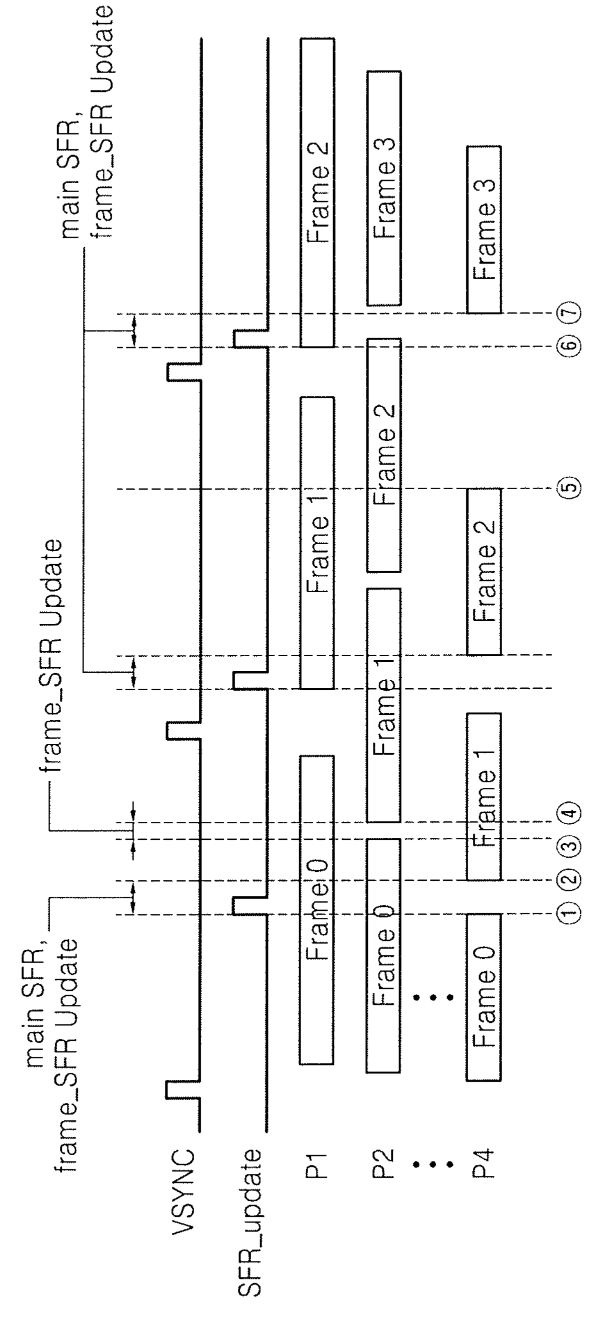
FIG. 11 is a schematic timing diagram illustrating data exemplary processing performed by each of the processing modules of FIG. 4.

FIG. 11 is a schematic timing diagram illustrating data processing performed by each of the processing modules of FIG. 4. Referring to FIGS. 4, 10, and 11, it is assumed that the processing modules P4, P3, P2, and P1 are used to process data of a first frame to a third frame.

By using the starter module 240, module frame IDs of the respective processing modules P4, P3, P2, and P1 are set to '0' and processing of a frame 0 starts.

Each of frames may include a plurality of pixels, e.g., 1920×1080 pixels. In one embodiment, each of the processing modules P4, P3, P2, and P1 may process all the plurality of pixels that form one frame. In another embodiment, each of the processing modules P4, P3, P2, and P1 may process only pixels within a specific window in each of the frames. For example, each of the processing modules P4, P3, P2, and P1 may process less than the entire frame (i.e., a part of a frame).

Each of the processing modules P4, P3, P2, and P1 stores frame synchronization information FRAME_SYNC_INFO corresponding to module frame ID Module_CFRMID. Each of the processing modules P4, P3, P2, and P1 receives data from the outside or data processed by a producer thereof in units of pixels, and processes the data received in units of pixels, based on the frame synchronization information FRAME_SYNC_INFO. Thus, the processing modules P4, P3, P2, and P1 may simultaneously process data of the same frame.

When the processing module P4 completes processing of data of the frame 0 (1), the processing module P4 updates module frame ID Module_CFRMID_4 to '1', and transmits an updating result to the system control logic 230. In this case, the recent frame ID RRFRMID is '0'.

The system control logic 230 determines whether all the stream processing modules P4 to P1 receive frame synchronization information FRAME_SYNC_INFO corresponding to the frame 0, since the module frame ID Module_CFRMID_4 is greater than the recent frame ID RRFRMID. The processing module P4 completes the processing of the data of the frame 0, and all the other stream processing modules P3, P2, and P1 process the data of the frame 0 by receiving the frame synchronization information FRAME_SYNC_INFO corresponding to the frame 0.

Thus, the system control logic 230 generates an SFR update signal SFR_update, and the main SFR 220 updates the frame synchronization information FRAME_SYNC_INFO and then increases the recent frame ID RRFRMID to '1' according to the SFR update signal SFR_update. Thus, since module frame ID Module_CFRMID_4 becomes equal to the recent frame ID RRFRMID, the processing module P4 receives frame synchronization information FRAME_SYNC_INFO_4 from the main SFR 220 and starts processing of data of a frame 1 (2).

After the processing module P2 completes the processing of the data of the frame 0 (3), the processing module P2 updates module frame ID Module_CFRMID_2 to '1' and transmits an updating result to the system control logic 230. Since the module frame ID Module_CFRMID_2 becomes equal to the recent frame ID RRFRMID, the processing module P2 receives the frame synchronization information FRAME_SYNC_INFO_2 from the main SFR 220 and starts processing of data of the frame 1 (4).

A case in which the processing module P4 completes processing of the data of the frame 0 to data of a frame 2 (5) will now be described. The processing module P4 updates the module frame ID Module_CFRMID_4 to '3' and transmits an updating result to the system control logic 230. In this case, the recent frame ID RRFRMID is '2'.

The system control logic 230 determines whether all the stream processing modules P4 to P1 receive frame synchronization information FRAME_SYNC_INFO corresponding to the frame 2, since the module frame ID Module_CFRMID_4 is greater than the recent frame ID RRFRMID. The processing module P1 is processing the data of the frame 1 and has yet to receive frame synchronization information FRAME_SYNC_INFO_1 corresponding to the frame 2. Thus, the system control logic 230 stands by until the processing module P1 receives the frame synchronization information FRAME_SYNC_INFO_1 corresponding to the frame 2.

When an operation of the processing module P1 starts (6), i.e., when module processing signal Module_Processing_1 transmitted to the system control logic 230 by the processing module P1 changes from logic low to logic high, the system control logic 230 determines that the processing module P1 receives the frame synchronization information FRAME_SYNC_INFO_1 corresponding to the frame 2. Since all the stream processing modules P4, P3, P2, and P1 receive the frame synchronization information FRAME_SYNC_INFO_1 corresponding to the frame 2, the system control logic 230 generates the SFR update signal SFR_update.

The main SFR 220 updates the frame synchronization information FRAME_SYNC_INFO and increases the recent frame ID RRFRMID to '3' according to the SFR update signal SFR_update. Thus, since the module frame ID Module_CFRMID_4 becomes equal to the recent frame ID RRFRMID, the processing module P4 receives the frame synchronization information FRAME_SYNC_INFO_4 from the main SFR 220 and starts processing of data of a frame 3 (7).

Figure 12:
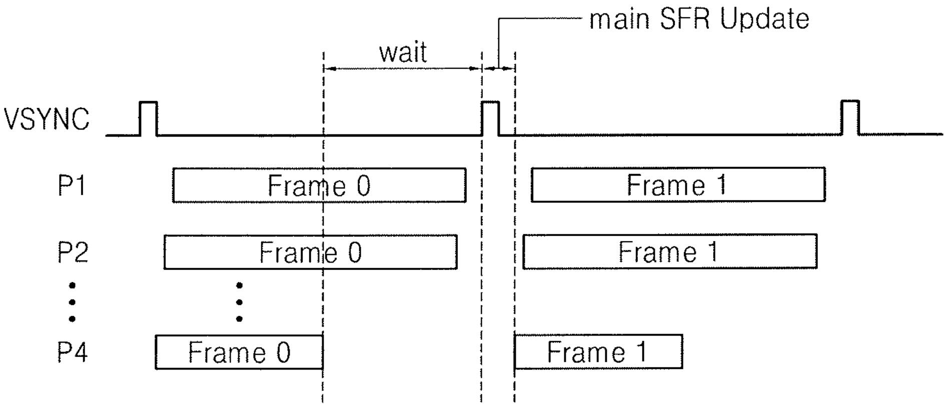
FIG. 12 is a timing diagram illustrating a case in which each of the processing modules processes data in units of frames according to a vertical synchronization signal, according to a comparative example of the inventive concept.

FIG. 12 is a timing diagram illustrating a case in which each of the processing modules P4, P3, P2, and P1 is processed in units of frames according to a vertical synchronization signal VSYNC, according to a comparative example of the inventive concept.

Referring to FIGS. 4, 11, and 12, when each of the processing modules P4, P3, P2, and P1 is processed in units of frames according to the vertical synchronization signal VSYNC, all the stream processing modules P4, P3, P2, and P1 process one frame at the same time.

Only after all the stream processing modules P4, P3, P2, and P1 complete processing of data of a frame 0, the main SFR 220 receives frame synchronization information corresponding to a frame 1 and the stream processing modules P4, P3, P2, and P1 start processing of the frame 1.

Thus, it is inefficient that the processing module P4 should stand by until the processing modules P3, P2, and P1 complete the processing of the data of the frame 0, even when the processing module P4 first completes the processing of the data of the frame 0. Also, since all the stream processing modules P4, P3, P2, and P1 start operations thereof at the same time after the main SFR 220 is updated, many data requests are concentrated to an external system (e.g., a bus, a memory, etc.) at once. Thus, the quality of service (QoS) of the whole system is degraded and a large capacity buffer is required to store data received at once.

In at least one embodiment of the inventive concept, the processing modules P4, P3, P2, and P1 individually store frame synchronization information and operate in synchronization with module frame IDs Module_CFRMID thereof, instead of the vertical synchronization signal VSYNC.

Accordingly, the processing modules P4, P3, P2, and P1 may be independently power/clock-gated, and a clock tree for each of the processing modules P4, P3, P2, and P1 thus decreases, thereby reducing power consumed to toggle the clock tree. Also, the system can be efficiently designed in terms of power consumption since the processing modules P4, P3, P2, and P1 may be power/clock-gated regardless of states of the other processing modules, and the system design may be easily modified since the processing modules P4, P3, P2 and P1 are independent from one another.

Also, since the processing module P4 does not stand by and may continuously process data, system inefficiency can be removed. Furthermore, since the stream processing modules P4, P3, P2, and P1 may start processing of a subsequent frame at different points of time after processing of a current frame ends, the amount of data requested to an external system at once decreases, thereby improving the QoS of the whole system. Also, since a large capacity buffer is not needed, an area of a SoC can be reduced.

Figure 13:
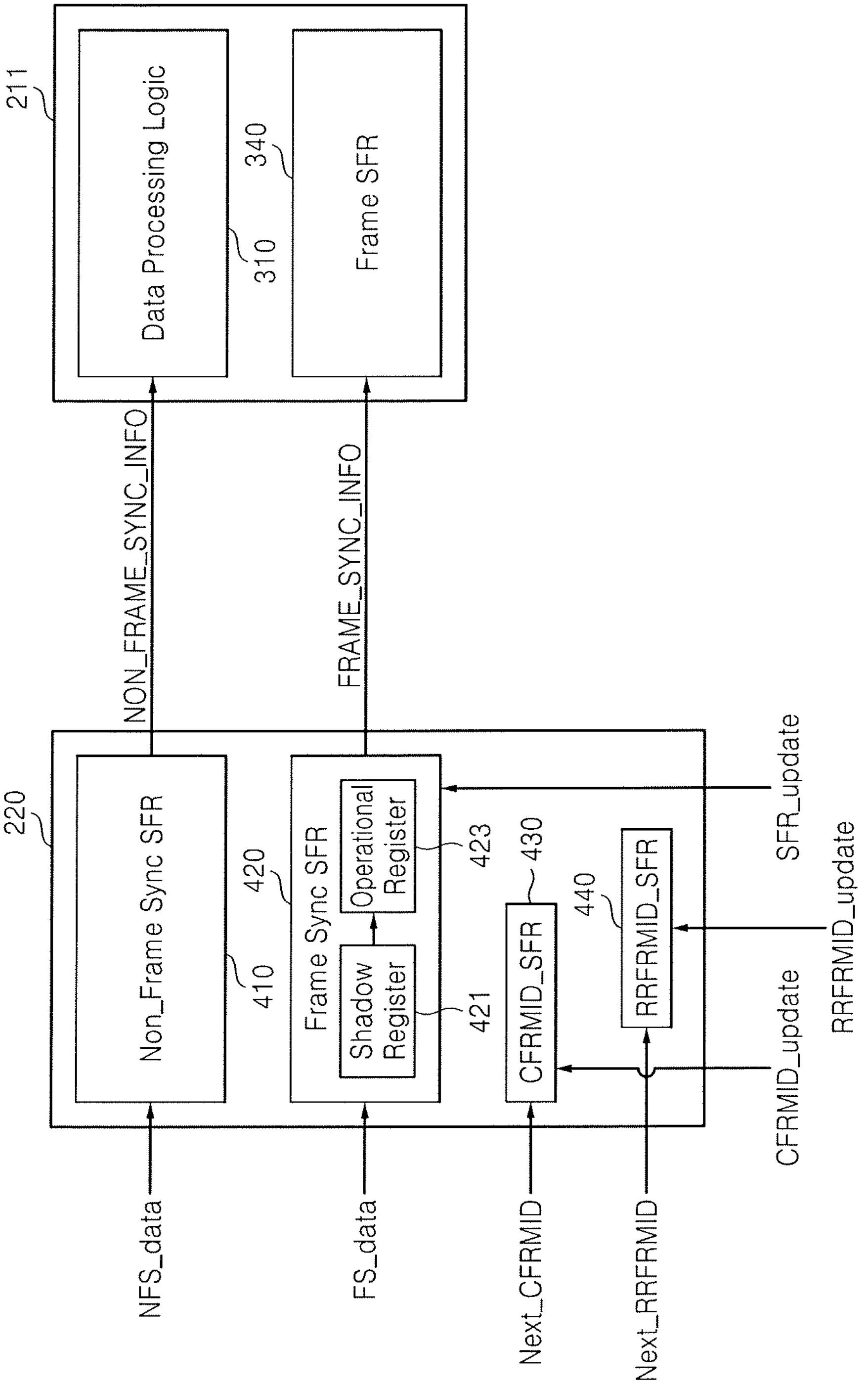
FIG. 13 is a block diagram illustrating exemplary transmission of data between a main SFR and each of the stream processing modules.

FIG. 13 is a block diagram illustrating transmission of data between a main SFR and each of the stream processing modules. Referring to FIGS. 4, 10, and 13, the main SFR 220 includes a non-frame synchronization SFR 410, a frame synchronization SFR 420, a CFRMID_SFR 430, and an RRFRMID_SFR 440.

The non-frame synchronization SFR 410 stores input non-frame synchronization information NFS_data received from the outside. The non-frame synchronization SFR 410 transmits the received input non-frame synchronization information NFS_data as non-frame synchronization information NON_FRAME_SYNC_INFO to the data processing logic 310 of each of the stream processing modules 210.

The frame synchronization SFR 420 includes a shadow register 421 and an operational register 423.

The shadow register 421 may receive input frame synchronization information FS_data corresponding to one frame several times from the outside, and store this information. When an SFR update signal SFR_update is generated, the shadow register 421 may output input frame synchronization information FS_data corresponding to one stored frame as frame synchronization information FRAME_SYNC_INFO to the operational register 423.

The operational register 423 stores the frame synchronization information FRAME_SYNC_INFO corresponding to the one stored frame. The operational register 423 may output the frame synchronization information FRAME_SYNC_INFO to the frame SFRs 340 of the stream processing modules 211, under control of the system control logic 230.

The data processing logic 310 of each of the stream processing modules 211 may process data in units of frames, based on the non-frame synchronization information NON_FRAME_SYNC_INFO received from the non-frame synchronization SFR 410 and the frame synchronization information FRAME_SYNC_INFO received from the operational register 423.

The CFRMID_SFR 430 may store a current frame ID CFRMID. The CFRMID_SFR 430 may receive a next module frame ID Next_CFRMID and a current frame ID update signal CFRMID_update from the system control logic 230. The CFRMID_SFR 430 may update a current frame ID CFRMID to the next module frame ID Next_CFRMID according to the current frame ID update signal CFRMID_update.

The RRFRMID_SFR 440 may store a recent frame ID RRFRMID. The RRFRMID_SFR 440 may receive the next module frame ID Next_RRFRMID and the recent frame ID update signal RRFRMID_update from the system control logic 230. The RRFRMID_SFR 440 may update the recent frame ID RRFRMID to the next module frame ID Next_RRFRMID according to the recent frame ID update signal RRFRMID_update.

Figure 14:
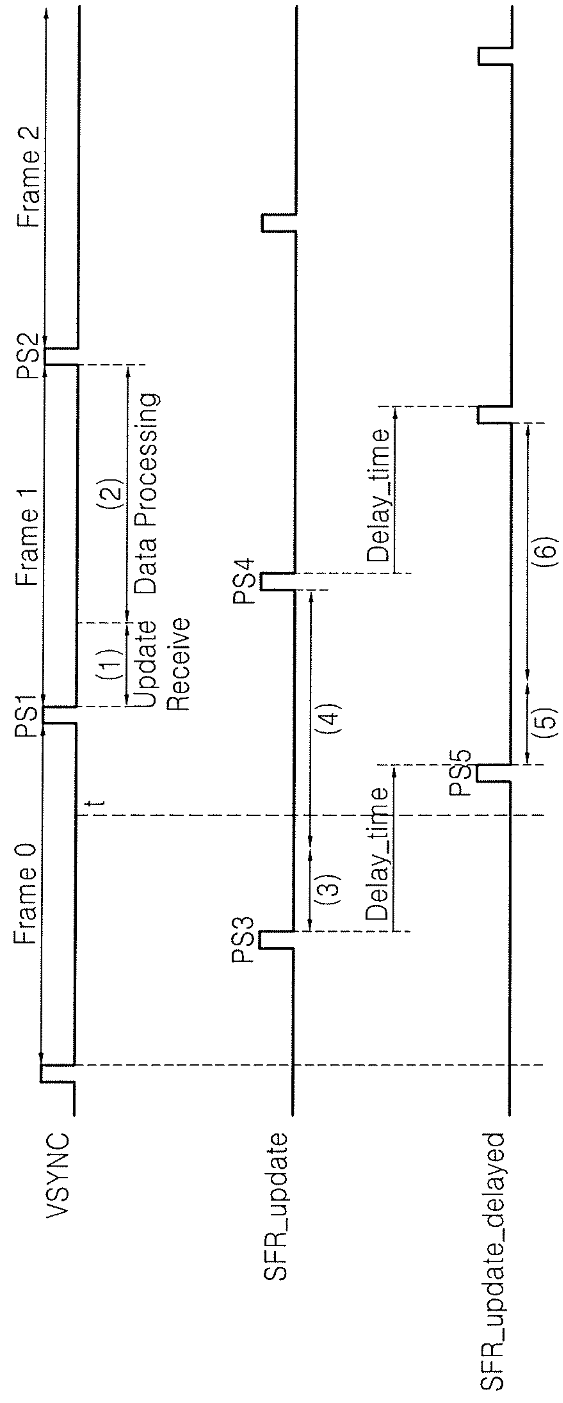
FIG. 14 is a timing diagram of a SFR delayed update signal according to an exemplary embodiment of the inventive concept.

FIG. 14 is a timing diagram of a SFR delayed update signal according to an exemplary embodiment of the inventive concept. Referring to FIGS. 3, 4, and 14, when each of processing modules 211 processes data in synchronization with a vertical synchronization signal VSYNC, each of the processing modules 211 receives data from the outside and the main SFR 220 receives frame synchronization information in a first section after a first pulse PS 1 of the vertical synchronization signal VSYNC is generated. Then, each of the processing modules 211 processes data of a frame 1 in a second section. Since a sufficient time should be secured between pulses PS1 and PS2 of the vertical synchronization signal VSYNC to process the data of the frame 1 so as to prevent distortion of data, the data should be received from the outside within a short time and the frame synchronization information of the main SFR 220 should be updated. That is, in the first section, many data requests are given to an external system at the same time, and the QoS of the whole system may thus be degraded.

If it is assumed that in an embodiment of the inventive concept, an $n^{th}$ processing module 211-n first processes data of a frame 0 and a pulse PS3 occurs in an SFR update signal SFR_update, the $n^{th}$ processing module 211-n receives data from the outside and the main SFR 220 receives frame synchronization information in a third section. Then, in a fourth section, the $n^{th}$ processing module 211-n processes data of a frame 1. Since one of the processing modules 211 processes the data of the frame 1 and a pulse PS4 occurs in the SFR update signal SFR_update, the data does not need to be received from the outside within a short time, thereby improving the QoS of the whole system.

It is assumed that an input is received from a user at a point of time t. The user may desire to change the resolution of an output image, for example, from 1024×768 to 768×1024. When the processing modules 211 process data in synchronization with the vertical synchronization signal VSYNC, the frame synchronization information of the main SFR 220 is updated in the first section and the user input may thus be reflected starting from when the frame 1 is processed.

In an embodiment of the inventive concept, the pulse PS3 is generated right after a processing module processes the data of the frame 0, and is thus generated earlier than the pulse PS1 of the vertical synchronization signal VSYNC. In this case, since frame synchronization information corresponding to the frame 1 is updated in the main SFR 220 in the third section, information input from a user at the point of time t is not reflected when the frame 1 is processed and is reflected starting from when a frame 2 is processed. Thus, a user may perceive a slow response rate.

The system logic 230 may generate an SFR delayed update signal SFR_update_delayed obtained by delaying pulses of the SFR update signal SFR_update for a delay time Delay_time to improve the response rate. The delay time Delay_ time may be a constant or may be a value that varies according to user settings. The $n^{th}$ processing module 211-n may receive data from the outside in a fifth section and may process the data of the frame 1 in a sixth section, according to the SFR delayed update signal SFR_update_delayed. In this case, the frame synchronization information corresponding to the frame 1 is updated in the main SFR 220 in the fifth section and the user input received at the point of time t may be reflected starting from when the frame 1 is processed.

In at least one embodiment of the inventive concept, the processing modules 210 processes at least two frames at the same time. However, the scope of the inventive concept may be expanded to a case in which the processing modules 210 process more than two frames at the same time.

In this case, the recent frame ID RRFRMID may be (the current frame ID CFRMID+(n−1)). The frame SFRs 340 of the respective processing modules 210 may store frame synchronization information corresponding to (n−1) frames. For example, the frame SFRs 340 of the respective processing modules 210 may store frame synchronization information corresponding to a CFRMID frame to a RRFRMID−1 frame, and update the frame synchronization information corresponding to the CFRMID frame to the frame synchronization information corresponding to the RRFRMID frame when processing of the CFRMID frame is completed.

The system control logic 230 may store module frame IDs Module_CFRMID of the respective processing modules 211, module enable signals Module_Enable corresponding to respective n frames, and touch values Touch corresponding to (n−1) frames, that is, a CFRMID frame to a RRFRMID−1 frame. The system control logic 230 may determine a point of time that values of the CFRMID and RRFRMID frames are to be updated, based on the module frame IDs Module_CFRMID, the module enable signals Module_Enable, and the touch values Touch.

Figure 15:
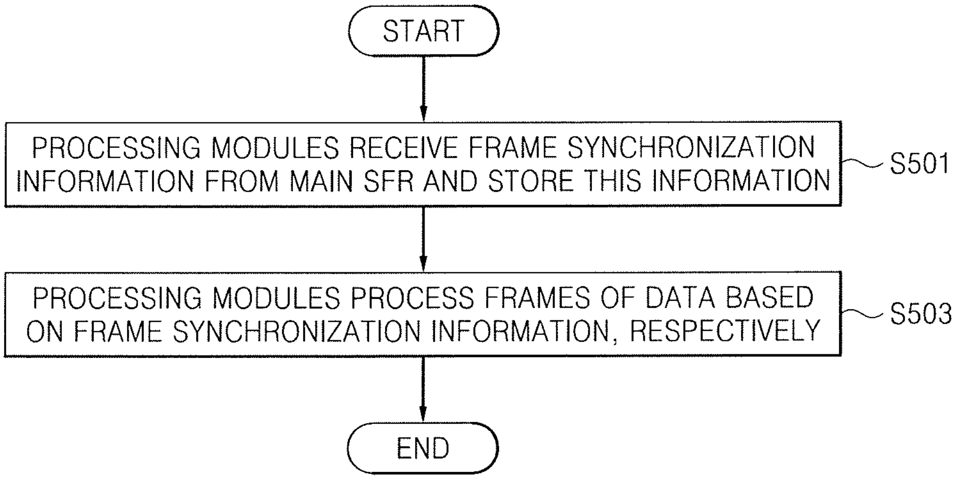
FIG. 15 is a flowchart illustrating a method of operating a system-on-chip (SoC) system according to an exemplary embodiment of the inventive concept.

FIG. 15 is a flowchart illustrating a method of operating a SoC system according to an exemplary embodiment of the inventive concept.

Referring to FIGS. 4 and 15, each of the processing modules 211-1 to 211-n receives frame synchronization information FRAME_SYNC_INFO from the main SFR 220 and stores this information (S501).

Then, each of the processing modules 211-1 to 211-n processes data in units of frames, based on the stored frame synchronization information FRAME_SYNC_INFO (S503).

Figure 16:
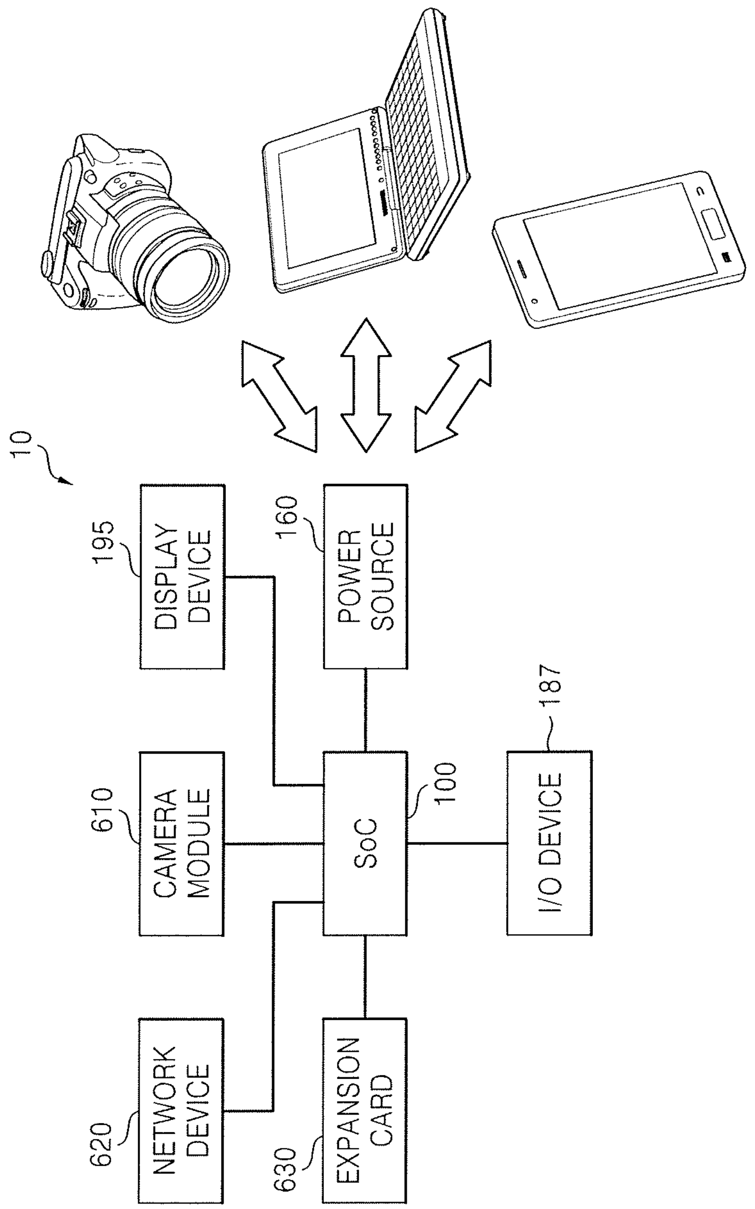
FIG. 16 is a block diagram of an electronic system including the SoC according to an exemplary embodiment of the inventive concept.

FIG. 16 is a block diagram of an electronic system 10 including the SoC according to an exemplary embodiment of the inventive concept. The electronic system 10 includes the SoC 100, a power source 160, I/O devices 187, an expansion card 630, a network device 620, and a display device 195. The electronic system 10 may further include a camera module 610.

The SoC 100 may control the operation of at least one of the elements 160, 187, 195, 620 and 630. The power source 160 may supply an operating voltage to at least one of the elements 187, 195, 620 and 630.

The I/O devices 187 may be devices that receive data transmitted to the electronic system 10 or transmit data from the electronic system 10 to an external device, through respective ports.

The expansion card 630 may be implemented as a secure digital (SD) card or a multimedia card (MMC). The expansion card 630 may be a subscriber identity module (SIM) card or a universal SIM (USIM) card.

The network device 620 enables the electronic system 10 to be connected with a wired or wireless network. The display device 195 displays data output from the I/O devices 187, the expansion card 630, or the network device 620.

The camera module 610 converts optical images into electrical images. Accordingly, the electrical images output from the camera module 610 may be stored in the SoC 100 or the expansion card 630. Also, the electrical images output from the camera module 610 may be displayed through the display device 195. The camera module 610 includes an image sensor.

According to at least one exemplary embodiment of the inventive concept, a plurality of pieces of synchronization information that a plurality of modules require, respectively, may be overlapped with respect to the plurality of modules, thereby reducing power consumption in a multimedia system and improving the performance of the multimedia system.

While the inventive concept has been particularly shown and described with reference to exemplary embodiments thereof, it will be understood that various changes in form and details may be made therein without departing from the spirit and scope of the inventive concept.

What is claimed is:

1. A multimedia system comprising:
- a main special function register (SFR) configured to store SFR information;
- a plurality of processing modules each configured to process frames of data, based on the SFR information; and
- a system control logic configured to control operations of the main SFR and the plurality of processing modules,
- wherein the plurality of processing modules are configured to process data of a current frame and a different subsequent frame at the same time period,
- wherein the system control logic applies an SFR update signal to the main SFR to enable a first processing module among the processing modules to process the data of the subsequent frame while a second processing module among the processing modules is processing the data of the current frame.

2. The multimedia system of claim 1, wherein each of the plurality of processing modules operates in synchronization with a module frame identification (ID) thereof.

3. The multimedia system of claim 1, wherein the SFR information comprises frame synchronization information and non-frame synchronization information, and the plurality of processing modules process the data using independent clock signals and separate parts of the frame synchronization information.

4. The multimedia system of claim 1, wherein each of the plurality of processing modules comprises a power/clock manager configured to control clock-gating and power-gating of the processing module.

5. The multimedia system of claim 1, further comprising a starter module configured to set a stream path including stream processing modules for processing the data among the plurality of processing modules, wherein the starter module sets a module frame ID of each of the respective stream processing modules.

6. The multimedia system of claim 5, wherein each of the plurality of processing modules comprises:
- a frame synchronization manager configured to determine whether processing of the subsequent frame of the data is to be started;
- a frame SFR configured to receive and store frame synchronization information transmitted from the main SFR; and
- a data processing logic configured to process each of the frames of the data, based on the frame synchronization information stored in the frame SFR.

7. The multimedia system of claim 6, wherein, when the frame synchronization manager determines that the processing of the data of the subsequent frame is to be started, the frame SFR receives the frame synchronization information corresponding to the subsequent frame from the main SFR, stores the frame synchronization information, and maintains the frame synchronization information until the frame synchronization manager determines that the processing of data of another subsequent frame is to be started.

8. The multimedia system of claim 6, wherein the main SFR stores an ID of a most recent frame among frames processed by the stream processing modules as a recent frame ID, and stores the frame synchronization information corresponding to the recent frame ID.

9. The multimedia system of claim 8, wherein, when processing of data corresponding to the module frame ID is completed, the frame synchronization manager increases the module frame ID and transmits the increased module frame ID to the system control logic, and the system control logic controls the frame synchronization manager to start processing of the data of the subsequent frame when the module frame ID and the recent frame ID are the same.

10. The multimedia system of claim 9, wherein, if the module frame ID is greater than the recent frame ID, the system logic generates the SFR update signal when all the stream processing modules receive the frame synchronization information corresponding to the recent frame ID, and the main SFR updates the frame synchronization information and the recent frame ID according to the SFR update signal.

11. The multimedia system of claim 10, wherein, if the module frame ID is greater than the recent frame ID, the system logic generates a recent frame ID update signal after a predetermined time period passes when all the stream processing modules receive the frame synchronization information co r responding to the recent frame ID.

12. The multimedia system of claim 10, wherein, when each of the stream processing modules receives and stores the frame synchronization information corresponding to each of the frames, each of the stream processing modules transmits a module processing signal to the system control logic, and the system control logic determines whether all the stream processing modules receive the frame synchronization information corresponding to the recent frame ID, according to the module processing signal.

13. The multimedia system of claim 5, wherein the starter module receives a stream start signal and initial frame ID from the system control logic, and transmits a stream request and the initial frame ID to the stream processing modules that provide the data to the starter module, each of the stream processing modules receives the stream request and the initial frame ID from the starter module or another stream processing module, transmits the stream request and the initial frame ID to the other stream processing module when the stream processing module receives the data from the other stream processing module, stores the initial frame ID as the module frame ID thereof, and receives frame synchronization information corresponding to the module frame ID.

14. A method of operating a multimedia system comprising a plurality of processing modules, the method comprising:

applying, by system control logic of the multimedia system, an update signal to a main special function register (SFR) of the multimedia system when a first processing module among the processing modules has completed processing of data of a current frame; and sending, by the main SFR, frame synchronization information to the first processing module in response to the update signal to enable the first processing module to process data of a different subsequent frame while a second processing module among the processing modules is still processing the data of the current frame.

15. The method of claim 14, wherein each of the processing modules operates in synchronization with a module frame identification (ID) thereof, and is independently clock-gated and power-gated.

16. A system comprising:

a plurality of processing modules, wherein a first subset of the processing modules process a current frame of data upon being assigned a first frame identifier, and increment the first frame identifier to a second frame identifier after the processing, wherein a second subset of the processing modules process a subsequent frame of data upon being assigned the second frame identifier;

a main special function register SFR configured to transmit information to the first subset of processing modules indicating whether each of the processing modules of the first subset is to operate in synchronization with the second frame identifier; and a system control logic applies an SFR update signal to the main SFR to enable a first processing module among the second subset to process the data of the subsequent frame while a second processing module among the first subset is processing the data of the current frame.

17. The system of claim 16, wherein the second subset of processing modules sequentially perform operations on the subsequent frame of data, and only the processing modules of the first subset that received information indicating they should operate perform operations on an output of the sequential operations.

18. The system of claim 17, wherein each of the plurality of processing modules comprises:

a frame synchronization manager configured to determine whether processing of the subsequent frame is to be started;

a frame SFR configured to receive and store the information transmitted from the main SFR; and a data processing logic configured to process each of the frames of the data, based on the information stored in the frame SFR.

19. The system of claim 18, wherein, when processing of data corresponding to the first frame identifier has completed, the frame synchronization manager increases the first frame identifier and transmits the increased frame identifier to the system control logic, and the system control logic controls the frame synchronization manager to start processing of the subsequent frame upon receipt of the increased frame identifier.

* * * * *